United States Patent
Suzuki et al.

(10) Patent No.: US 9,242,478 B2
(45) Date of Patent: Jan. 26, 2016

(54) WRITING CONTROLLING APPARATUS, IMAGE FORMING APPARATUS, AND COMPUTER PROGRAM PRODUCT

(71) Applicants: Masashi Suzuki, Saitama (JP); Katsuhiko Maeda, Kanagawa (JP); Yoshio Kanzaki, Kanagawa (JP); Masahiko Oikawa, Kanagawa (JP); Yasuhiro Abe, Kanagawa (JP); Hiroaki Nishina, Kanagawa (JP); Yuuki Honda, Kanagawa (JP)

(72) Inventors: Masashi Suzuki, Saitama (JP); Katsuhiko Maeda, Kanagawa (JP); Yoshio Kanzaki, Kanagawa (JP); Masahiko Oikawa, Kanagawa (JP); Yasuhiro Abe, Kanagawa (JP); Hiroaki Nishina, Kanagawa (JP); Yuuki Honda, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 0 days.

(21) Appl. No.: 14/102,738

(22) Filed: Dec. 11, 2013

(65) Prior Publication Data
US 2014/0168343 A1 Jun. 19, 2014

(30) Foreign Application Priority Data
Dec. 14, 2012 (JP) .................... 2012-273396

(51) Int. Cl.
*B41J 2/47* (2006.01)
*B41J 2/435* (2006.01)
*G06K 15/12* (2006.01)

(52) U.S. Cl.
CPC ........ *B41J 2/435* (2013.01); *B41J 2/471* (2013.01); *G06K 15/1209* (2013.01)

(58) Field of Classification Search
CPC ............ B41J 2/455; B41J 2/471; B41J 2/473; B41J 2/435; G06K 15/1209
USPC ................................. 347/243, 247
See application file for complete search history.

(56) References Cited

U.S. PATENT DOCUMENTS

| 6,100,908 A * | 8/2000 | Nishizawa ............ 347/133 |
| 6,408,013 B1 | 6/2002 | Akagi et al. |
| 2007/0097201 A1 | 5/2007 | Kanzaki et al. |
| 2013/0287418 A1* | 10/2013 | Akagi ................ 399/51 |

FOREIGN PATENT DOCUMENTS

| JP | 2000-294871 | 10/2000 |
| JP | 2007-118521 | 5/2007 |
| JP | 2007118521 A * | 5/2007 |
| JP | 2009-241334 | 10/2009 |
| JP | 2009241334 A * | 10/2009 |

* cited by examiner

*Primary Examiner* — Sarah Al Hashimi
(74) *Attorney, Agent, or Firm* — Harness, Dickey & Pierce, P.L.C.

(57) ABSTRACT

The invention is concerning the writing controlling apparatus that includes an acquiring unit configured to acquire a plurality of light amounts of a light source driven while changing an input current in non-effective scanning periods during which an image carrier is not irradiated with light from the light source, as a plurality of output results; a detecting unit configured to detect characteristics of the light source using the output results thus acquired; and a correcting unit configured to correct a current to be applied to the light source based on the characteristics thus detected.

14 Claims, 12 Drawing Sheets

WRITING CONTROLLING APPARATUS, IMAGE FORMING APPARATUS, AND COMPUTER PROGRAM PRODUCT

CROSS-REFERENCE TO RELATED APPLICATIONS

The present application claims priority to and incorporates by reference the entire contents of Japanese Patent Application No. 2012-273396 filed in Japan on Dec. 14, 2012.

BACKGROUND OF THE INVENTION

1. Field of the Invention

The present invention relates to a writing controlling apparatus for controlling a current to be applied to a light source used in writing on an image carrier, an image forming apparatus including the writing controlling apparatus, and a computer program product including a computer-readable recording medium having a computer-readable program for executing a writing control.

2. Description of the Related Art

A laser printer performs writing by irradiating a photosensitive element that is an image carrier with a laser beam, thereby forming a latent image on the surface of the photosensitive element. The laser printer then performs developing by attaching toner on the surface of the photosensitive element on which the latent image is formed, and performs printing by transferring and fixing the image thus developed onto a paper sheet.

Because semiconductor lasers, which are inexpensive and small, are generally used in writing, laser printers includes a laser diode (LD), which is a semiconductor laser, and a driving circuit for driving the LD.

Available as schemes for driving an LD are a zero-bias modulation and a biased modulation. The zero-bias modulation is a scheme in which the LD is driven by a current corresponding to an input signal, while the bias current used for establishing a desired operating point is set to zero. By contrast, the biased modulation is a scheme in which the LD is driven by adding a current corresponding to an input signal to a bias current that is smaller than a threshold current, while the bias current is kept applied to the LD.

The biased modulation is currently often used because the biased modulation incurs a short delay time in generating a carrier at a density capable of oscillating a laser, so that it is possible to reduce the time required for the LD to start emitting light after a current corresponding to an input signal is started being applied.

Characteristics of an LD will now be explained briefly with reference to FIG. 1. FIG. 1 is a schematic diagram illustrating a relation between an input current and an optical output (light amount). The LD starts emitting light as the current is gradually increased. The light amount then increases moderately in proportional to the current level. The optical output then sharply increases when the current exceeds a certain level, and causes a laser oscillation. As a result, a laser beam is output from the LD. The current at the level at which the optical output sharply increases is referred to as an oscillation starting current.

A rate of this optical output change with respect to the current having exceeded the oscillation starting current is referred to as differential quantum efficiency, and is almost constant. When a line having the rate of this optical output change as a gradient is extended, as illustrated in a dotted line, the line intersects with a line of a zero optical output. The current level at this intersection serves as a threshold current, and is the lowest current capable of causing a laser oscillation. An appropriate bias current is then determined as a current equal to or lower than the threshold current. As an example, the bias current is determined as a threshold current×k, where k is a value equal to or more than 0.7 and equal to or less than 1.0.

The characteristics of an LD include the threshold current and the differential quantum efficiency, and these characteristics are known to vary greatly depending on the temperature. These characteristics are also known to vary depending on the time of a continuous LD operation.

Usually, immediately before printing is started, the light amount is measured while changing the current level, and the relation between the current and the light amount is acquired to allow these characteristics to be detected. The characteristics thus detected are used in determining an appropriate bias current level. The bias current level thus determined is set as a setting value, and the bias current to be supplied to the LD is controlled to the level specified as the setting value.

When the number of paper sheets to be printed is only one, a certain level of image quality can be ensured merely by detecting the characteristics of the LD immediately before the printing is started. However, when a plurality of paper sheets are to be printed successively, because the temperature of the LD increases and the time of a continuous operation is extended, the characteristics of the LD might differ greatly from those detected immediately before the printing is started, and the certain level of image quality can no longer be ensured.

In response to this problem, Japanese Patent Application Laid-open No. 2000-294871, for example, discloses a technology in which a temperature change and a time of a continuous operation are detected, and, if there is any change of a predetermined level, the detection of these characteristics (characteristics detection) is conducted again.

However, this technology requires some means for detecting a temperature change and a time of a continuous operation, and another characteristic detection is not conducted unless any change of a predetermined level is detected. Furthermore, a downtime (time in which printing is not executed) occurs while the characteristics detection is conducted again, disadvantageously.

Therefore, Japanese Patent Application Laid-open No. 2007-118521, for example, discloses a technology that allows characteristics detection to be conducted even when no change of a predetermined level is detected, without requiring such means, and also enabling a downtime to be avoided while the characteristics detection is conducted.

When a semiconductor laser performs scanning for a line in the main-scanning direction, the scanning starts at a point outside one end of the photosensitive element, travels across the photosensitive element, and reaches a point outside the other end of the photosensitive element, in the manner described later. The period during which the laser scans across the photosensitive element, within the period in which the semiconductor laser scans for one line, is referred to as an effective scanning period. The periods in which the laser scans the section outside of the one end and the section outside of the other end of the photosensitive element (the periods outside of the period during which the laser scans across the photosensitive element) are to be non-effective scanning periods.

In the technology disclosed in Japanese Patent Application Laid-open No. 2007-118521, in an interval between a paper sheet and another paper sheet each requiring a semiconductor laser to scan a plurality of lines, the semiconductor laser is caused to perform scanning in the effective scanning period and the non-effective scanning periods in order to conduct characteristics detection. A downtime is avoided by reflecting the result of the detection during the interval between these paper sheets.

However, in this technology, in order to enable characteristics detection, the photosensitive element during the interval between the paper sheets is irradiated with a laser beam in the effective scanning period, thereby forming a latent image on the photosensitive element. If the latent image is developed and transferred onto a paper sheet, horizontal lines are produced on the paper sheet.

If the latent image is transferred onto a section between the paper sheets without being transferred onto a paper sheet, the latent image is transferred onto a transfer belt carrying these paper sheets. The latent image is then transferred onto the rear side of a paper sheet fed onto the transfer belt, and causes the rear side to be smeared with toner.

Therefore, it has been desirable to provide an apparatus and the like that can avoid formation of horizontal lines and smearing of a rear side without incurring any downtime.

SUMMARY OF THE INVENTION

It is an object of the present invention to at least partially solve the problems in the conventional technology.

According to the present invention, there is provided: a writing controlling apparatus for controlling a current to be applied to a light source that is used in performing writing on an image carrier, the writing controlling apparatus comprising: an acquiring unit configured to acquire a plurality of light amounts of the light source driven while changing an input current in non-effective scanning periods during which the image carrier is not irradiated with light from the light source, as a plurality of output results; a detecting unit configured to detect characteristics of the light source using the output results thus acquired; and a correcting unit configured to correct the current to be applied to the light source based on the characteristics thus detected.

The present invention also provides an image forming apparatus comprising: an image carrier; a light source configured to output light with which writing on the image carrier is performed; and a writing controlling apparatus configured to control a current to be applied to the light source.

In the above-mentioned image forming apparatus, the writing controlling apparatus comprises: an acquiring unit configured to acquire a plurality of light amounts of the light source driven while changing an input current in non-effective scanning periods during which the image carrier is not irradiated with light from the light source, as a plurality of output results; a detecting unit configured to detect characteristics of the light source using the output results thus acquired; and a correcting unit configured to correct the current to be applied to the light source based on the characteristics thus detected.

The present invention also provides a computer program product comprising a non-transitory computer-readable recording medium having a computer-readable computer program for performing controlling of a current to be applied to a light source that is used in performing writing on an image carrier, wherein the computer program causes a computer to execute: acquiring a plurality of light amounts of the light source driven while changing an input current in non-effective scanning periods during which the image carrier is not irradiated with light from the light source, as a plurality of output results; detecting characteristics of the light source using the output results thus acquired; and correcting the current to be applied to the light source based on the characteristics thus detected.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 2:
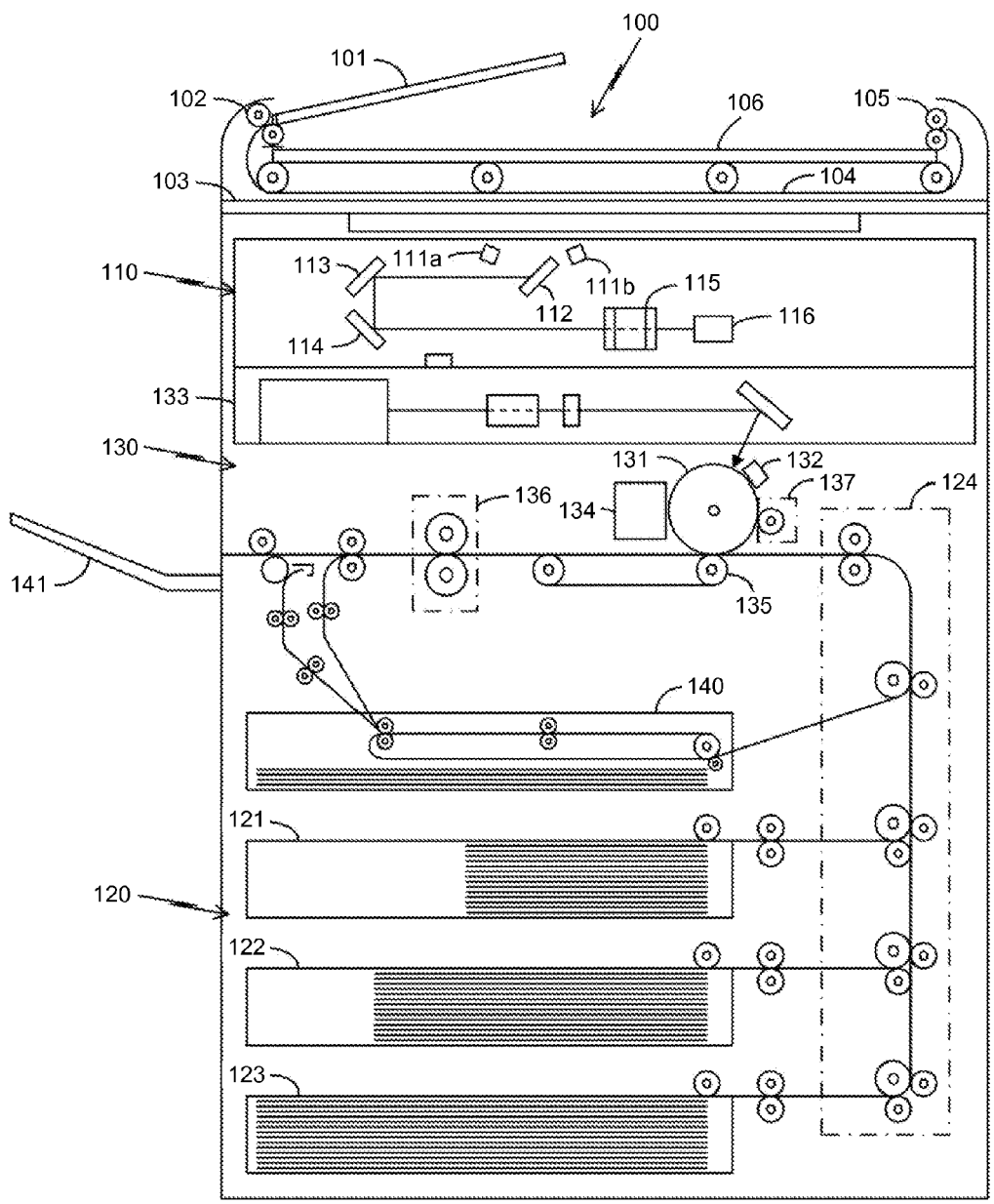
FIG. 2 is a schematic diagram illustrating the general configuration of an image forming apparatus according to an embodiment of the present invention.

FIG. 2 is a schematic diagram illustrating the general configuration of an image forming apparatus according to an embodiment of the present invention. The image forming apparatus illustrated in FIG. 2 is configured as a multi-function peripheral (MFP) including functions of a printer, a scanner, a facsimile, and a copier. The MFP includes an automatic document feeder (ADF) 100, an image scanner 110, a paper feeder 120, an image forming unit 130, and a controlling unit not illustrated. In this embodiment, the image forming apparatus is configured as an MFP, but the image forming apparatus may also be a laser printer, for example, without limitation to the MFP.

The ADF 100 includes a document feeding tray 101 on which a document to be fed is placed, document feeding rollers 102 that feed the document, and a document platen 103 on which the document having fed is placed. The ADF 100 also includes a document carriage belt 104 that conveys the document across the document platen 103, document discharging rollers 105 that discharge the document thus conveyed, and a document discharge tray 106 on which the document thus discharged is stored. The ADF 100 also includes a registration sensor, not illustrated, for detecting the timing at which the document is fed into a reading position.

The image scanner 110 includes light sources 111*a* and 111*b* for outputting light with which the document is irradiated via the document platen 103, reflecting mirrors 112, 113, and 114 for reflecting a reflected light from the document to a predetermined direction, and a collecting lens 115 for condensing light. The image scanner 110 also includes an image sensor 116 on which the light condensed by the collecting lens 115 is incident.

As the image sensor 116, a charge-coupled device (CCD) image sensor, a contact image sensor (CIS), or the like is used. The image sensor 116 photoelectrically converts incident light to an electrical signal (analog signal). The image sensor 116 is implemented on a sensor board not illustrated, and an analog-to-digital (A/D) conversion circuit also implemented on the sensor board converts the electrical signal into digital data, and outputs the digital data to the image forming unit 130.

The paper feeder 120 includes feeding tray 121, 122, and 123 respectively storing therein paper sheets of different sizes. The paper feeder 120 also includes conveying rollers 124 serving as conveying means for conveying the paper sheets stored in the feeding trays 121, 122, and 123 into an image forming position of the image forming unit 130.

The image forming unit 130 includes a photosensitive element 131 serving as an image carrier, a charging unit 132 for charging the photosensitive element 131, and a writing unit 133 that performs writing on the charged photosensitive element 131 using a laser beam. The image forming unit 130 also includes a developing unit 134 that performs developing by attaching toner, a transfer unit 135 in which an image thus developed is transferred onto a paper sheet, and a fixing unit 136 that fixes the image onto the paper sheet. The image forming unit 130 also includes a cleaning unit 137 for removing toner remaining on the photosensitive element 131.

The image forming apparatus illustrated in FIG. 2 uses toner of only one color, and each of the photosensitive element 131, the charging unit 132, the developing unit 134, the transfer unit 135, and the cleaning unit 137 are provided in singularity. An apparatus capable of performing color printing would use toners of four or more colors such as yellow (Y), magenta (M), cyan (C), and black (K), and each of the elements such as the photosensitive element 131 would be provided in the number equal to the number of the toner colors.

In the configuration illustrated in FIG. 2, the image forming apparatus also includes a sheet reversing unit 140 that reverses and feeds the paper sheet, and a discharge tray 141 onto which the paper sheet having an image fixed is discharged. The sheet reversing unit 140 may be included or may not be included in the image forming apparatus.

When an image is to be formed in the image forming unit 130, the charging unit 132 charges the photosensitive element 131. The writing unit 133 then irradiates the photosensitive element 131 with a laser beam modulated based on image data, and forms an electrostatic latent image on the surface of the photosensitive element 131.

An electrostatic latent image is a distribution of an electrical static charge across an image, and is an image that is invisible until the image is developed. The photosensitive element 131 is rotated at a constant speed. The developing unit 134 attaches toner to the photosensitive element 131, whereby developing the electrostatic latent image on the photosensitive element 131. This developing makes the image having formed on the surface of the photosensitive element 131 visible.

The toner attached on the surface of the photosensitive element 131 forms a toner image. The transfer unit 135 then presses and transfers the toner image against and onto a paper sheet supplied from the paper feeder 120. Once the toner image formed on the photosensitive element 131 is transferred onto the paper sheet, the cleaning unit 137 removes the toner remaining on the photosensitive element 131.

Immediately after the image is transferred onto the paper sheet, the toner is just sitting on the paper sheet. Therefore, the fixing unit 136 fixes the image onto the paper sheet, by heating the toner image, whereby causing the toner to melt, and by applying a pressure to the image. The paper sheet having toner fixed is discharged onto the discharge tray 141.

Figure 3:
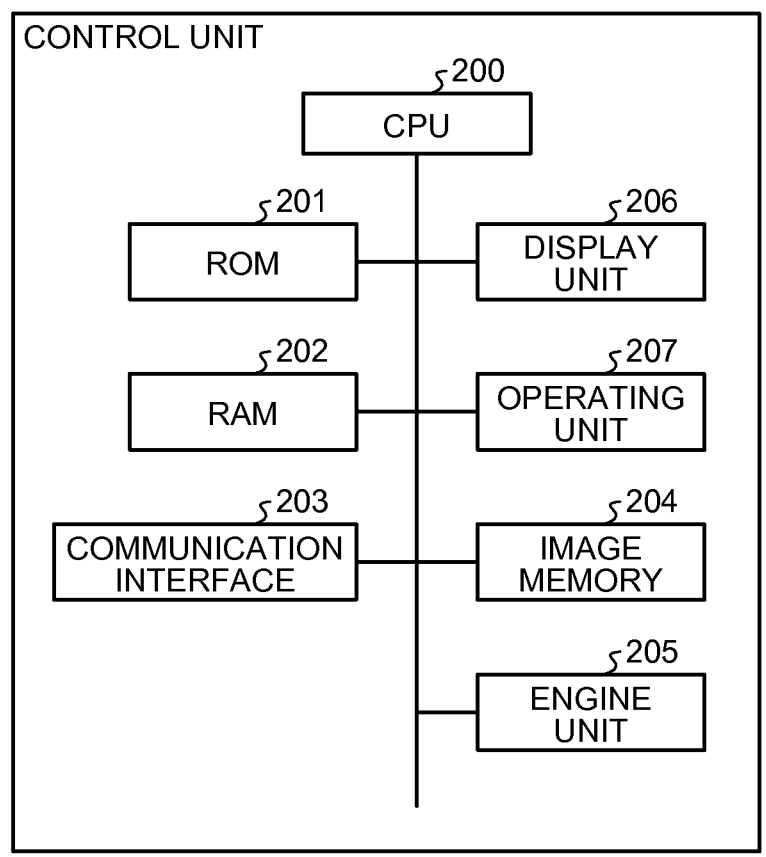
FIG. 3 is a schematic diagram illustrating an example of the hardware configuration of a controlling unit included in the image forming apparatus illustrated in FIG. 2.

The configuration of the controlling unit included in the image forming apparatus will now be explained with reference to FIG. 3. The controlling unit includes a central processing unit (CPU) 200 that controls the entire image forming apparatus, a read-only memory (ROM) 201 that stores therein various computer programs, a random access memory (RAM) 202 that stores therein setting values and the like, and a communication interface 203 that enables communications with a personal computer (PC) or the like.

The controlling unit also includes an image memory 204 that stores therein an image rasterized in a drawing process on a PC or the like, and an engine unit 205 that controls the operations of pieces of hardware. The controlling unit also includes a display unit 206 that displays a current status or the like, and an operating unit 207 that receives user inputs. Illustrated in FIG. 3 is an example in which the controlling unit is provided only with the ROM 201, the RAM 202, and the image memory 204 as storage media, but the controlling unit may also include a hard disk drive (HDD) and the like.

The CPU 200 reads computer programs stored in the ROM 201, and executes the computer programs. The various computer programs includes a computer program for performing a writing control, which will be described later. In response to an input received by the operating unit 207 or a print request received from a PC, for example, the CPU 200 executes a computer program, and performs a predefined process using the RAM 202 as a working memory.

The CPU 200 also executes a computer program to compress image data read by the image scanner 110 using the RAM 202, and to store the image data in the image memory 204. When the image data is to be printed, the CPU 200 executes a computer program to read the image data from the image memory 204, to decompress the image data, to temporarily store the image data in the RAM 202, and to output the image data to the engine unit 205.

The engine unit 205 controls pieces of hardware provided to the writing unit 133, the developing unit 134, the transfer unit 135, the fixing unit 136, and the like. As an example, the engine unit 205 generates data for controlling illuminations of the LD serving as a light source in the writing unit 133, and drives the LD based on the data, whereby allowing the writing unit 133 to perform writing on the photosensitive element 131.

Figure 4:
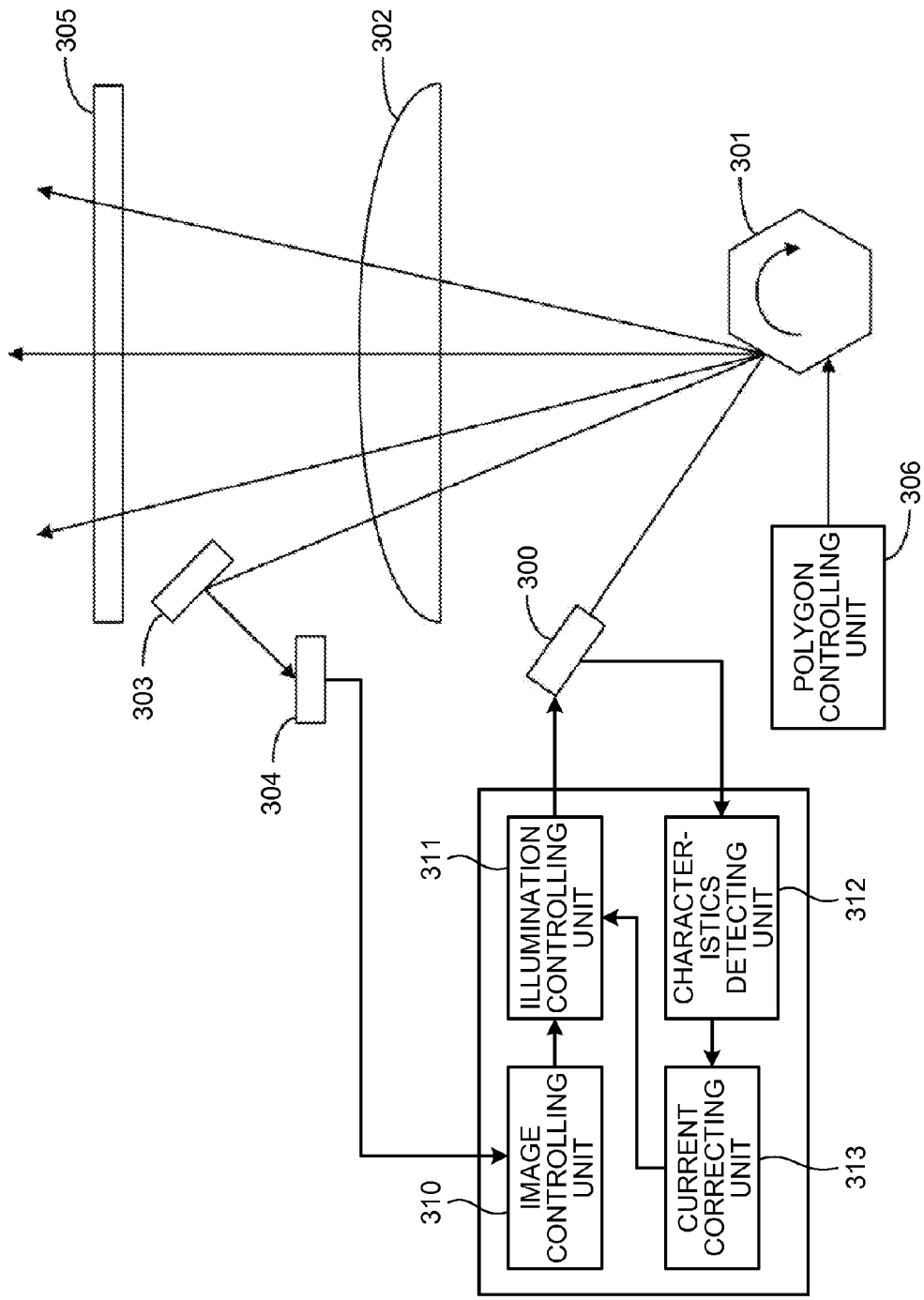
FIG. 4 is a schematic diagram illustrating the general configuration of a writing unit included in the image forming unit illustrated in FIG. 2.

The configuration of the writing unit 133 will now be explained with reference to FIG. 4. The writing unit 133 includes a writing optical system and a writing controlling system latter of which is a part of the engine unit 205.

The writing optical system includes an LD 300 serving as a light source, a polygon mirror 301 serving as a scanning unit, an Fθ lens 302 serving as a scanning speed converting unit, and a reflecting mirror 303 provided outside of the range in which the photosensitive element 131 is writing-scanned. The writing optical system also includes a synchronization detecting plate 304 on which scanning light reflected from the reflecting mirror 303 is incident. The synchronization detecting plate 304 detects an effective scanning starting position at which the scanning light is capable of writing to the photosensitive element 131, and controls the positions at which the scanning light starts writing to be constant in the main-scanning direction.

The writing optical system also includes a dust-proof glass 305 that is provided at the boundary between the writing unit 133 and the image forming unit 130 so that dusts, dirt, and the like do not enter the image forming unit 130. The writing optical system also includes a polygon controlling unit 306 that performs a driving control of a polygon motor for driving the polygon mirror 301 in rotation.

The writing controlling system is configured as a writing controlling apparatus, and includes an image controlling unit 310, an illumination controlling unit 311, a characteristics detecting unit 312 serving as an acquiring unit and a detecting unit, and a current correcting unit 313 serving as a correcting unit. The image controlling unit 310 may also include, as an example, a timing controlling unit, an LD driving data generating unit, a pixel clock generating unit, and a data processing unit.

The timing controlling unit includes a main-scanning counter and a sub-scanning counter, and controls the timing at which an image is formed in the main-scanning direction and the sub-scanning direction using these counters. The pixel clock generating unit generates a pixel clock that is synchronized with an output signal from the synchronization detecting plate 304, and supplies the pixel clock to the data processing unit and to the LD driving data generating unit. The data processing unit generates image data with reference to the pixel clock, and generates a process pattern based on a timing signal from the timing controlling unit.

The LD driving data generating unit generates laser driving data (modulation data) for a piece of image data received from the data processing unit with reference to the pixel clock generated by the pixel clock generating unit, and causes the illumination controlling unit 311 to drive the LD 300.

The image controlling unit 310 sends the laser driving data to the illumination controlling unit 311 as image information. The image controlling unit 310 also sends an FGATE signal indicating that image formation is currently being executed or indicating that image formation has been completed to the illumination controlling unit 311. The timing controlling unit then causes the sub-scanning counter, that counts a synchronization detection signal at a negation (rise) of the FGATE signal, to operate to control the timing of image formation in the sub-scanning direction.

The image controlling unit 310 generates LD driving data such as a pattern for correcting a density and a pattern for correcting a positional deviation, and causes the illumination controlling unit 311 to drive the LD 300, and thereby generates each of these patterns. The image controlling unit 310 also generates data for detecting characteristics of the LD 300, sends the data to the illumination controlling unit 311, and causes the illumination controlling unit 311 to drive the LD 300 based on the data.

The illumination controlling unit 311 includes a driving circuit for driving the LD 300. The illumination controlling unit 311 causes the LD 300 to illuminate at the timing at which the FGATE signal being received from the image controlling unit 310 is asserted (drops), and causes the LD 300 to execute writing to the photosensitive element 131 based on the image information. The FGATE signal drops at the timing at which one image formation, e.g., printing of one page, is started, and rises when the image formation is completed.

During the non-effective scanning period, the illumination controlling unit 311 drives the LD 300 while changing the input current based on the data for the characteristic detection. As an example, assuming that a plurality of image formations are performed successively, the illumination controlling unit 311 drives the LD 300 while changing the input current during a plurality of non-effective scanning periods within a period from when one image formation is started to when the next image formation is started. Specifically, when printed is a document having a plurality of pages, the on-effective scanning periods are a plurality of non-effective scanning periods included in a period from when printing of one page of the document is started to when printing of the next page is started.

The effective scanning period is a period during which writing in the main-scanning direction can be performed by allowing the photosensitive element 131 to be irradiated with the laser beam. By contrast, the non-effective scanning period is a period during which the photosensitive element 131 is not irradiated with the laser beam output from the LD 300.

To explain more specifically, the light from the LD 300 that is a light source is reflected by the polygon mirror 301, and travels toward the photosensitive element 131. The scanning for one line performed by the polygon mirror 301 is started at a point outside one end of the photosensitive element 131 and completed at a point outside the other end of the photosensitive element 131. The period during which the laser beam scans across the photosensitive element 131 represents the effective scanning period, whereas the period during which the laser beam scans across each side of the photosensitive element 131, not across the photosensitive element 131, represents the non-effective scanning period.

During the non-effective scanning period, a synchronizing illumination is performed to detect a main scanning reference position, that is, to detect a writing starting position in the main-scanning direction. A synchronizing illumination is performed using the synchronization detecting plate 304. The LD 300 is also illuminated for an automatic power control (APC). When the LD 300 is caused to illuminate, an illuminating current is added to a bias current and applied to LD 300 to achieve a required light amount. Therefore, in the APC, the light amount is adjusted to a specified level by biasing the bias current in unit of a scanning line while keeping the illuminating current fixed. Therefore, in practice, the characteristics detection is performed during a period of the non-effective scanning period excluding those during which the LD 300 is illuminated for the purpose of the synchronizing illumination and the APC.

As timing at which characteristics detection is performed, completion of the illumination for the APC may be used as a trigger for performing the synchronizing illumination, and completion of the synchronizing illumination may be used as a trigger for executing the characteristics detection, as an example. This timing is merely an example, and the characteristics detection may be executed at any other timing.

The characteristics detecting unit 312 functions as an acquiring unit, and acquires a plurality of optical outputs (light amounts) output from the LD 300 correspondingly to a plurality of respective input currents as a plurality of output results during the non-effective scanning periods. The characteristics detecting unit 312 functions as a detecting unit, and detects the characteristics of the LD 300 using the output results thus acquired. The characteristics detecting unit 312 may acquire the entire data required in establishing the relation illustrated in FIG. 1 (input currents and optical outputs), if the data can be acquired at once, or may acquire the data discretely, in a manner divided into several pieces. The characteristics detecting unit 312 may also establish the relation by linking the data acquired discretely. The characteristics detecting unit 312 detects a threshold current, which is one of the characteristics of the LD 300, from the relation thus established.

To detect the threshold current, an oscillation starting current at which the optical output sharply increases is acquired using the input currents and the optical outputs thus acquired. A relational expression is then acquired using the input currents exceeding the oscillation starting current and the optical outputs corresponding to the input currents. The relational expression can be generally expressed in a linear expression, and the gradient of the linear expression can be acquired as the differential quantum efficiency. Finally, the threshold current is detected using the relational expression by acquiring a current resulting in a zero optical output.

An input current may be a current maintained at a given level, or may be a current caused to vary successively within a certain range, e.g., from zero amperes to one ampere during one non-effective scanning period. Acquired as an output result is one light amount that is an output corresponding to one current, or a light amount varying successively that is an output corresponding to a current caused to vary successively.

The current correcting unit 313 corrects a bias current that is a current to be applied to the LD 300, based on the characteristics thus detected. As an example, based on the threshold current thus detected, the current correcting unit 313 determines the bias current to be applied to the LD 300 before the next image formation is started (the next page is started being printed). The current correcting unit 313 then corrects the bias current by updating a setting value specified as the bias current level to the bias current level thus determined.

The image controlling unit 310, the illumination controlling unit 311, the characteristics detecting unit 312, and the current correcting unit 313 are realized by causing the CPU 200 to execute a computer program for performing a writing control stored in the ROM 201.

The timing at which the characteristics detection is actually performed using the writing controlling apparatus according to the embodiment during the non-effective scanning periods will now be explained with reference to FIGS. 5 to 8. FIGS. 5 to 8 are schematic diagrams illustrating first to fourth embodiments of the timing, respectively. An FGATE signal is also illustrated in FIGS. 5 to 8.

Figure 5:
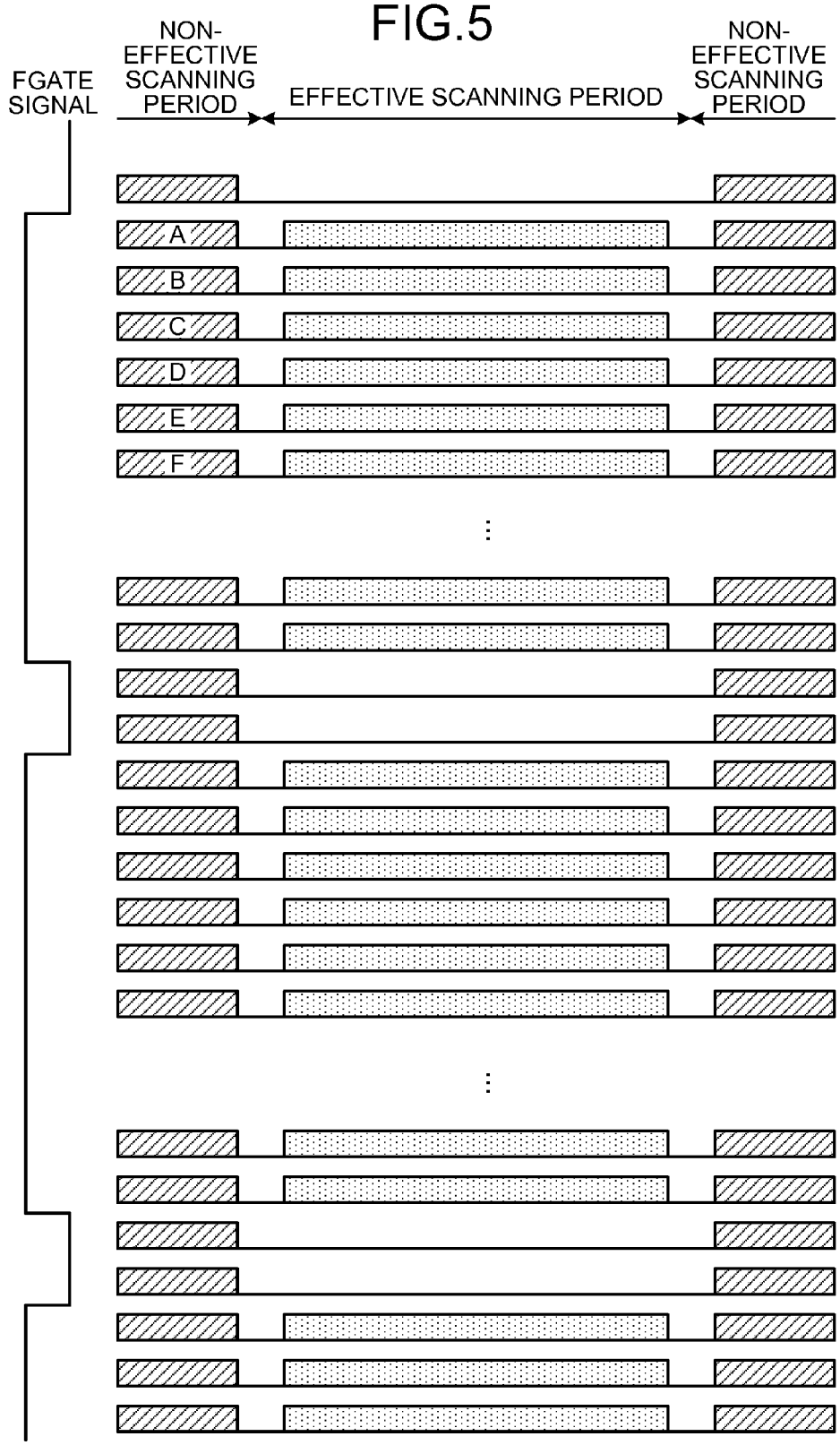
FIG. 5 is a schematic diagram illustrating a first timing at which a writing controlling unit conducts characteristics detections.

FIG. 5 is a schematic diagram illustrating an example in which the characteristics detection is performed in each of the non-effective scanning periods, and the result is reflected during an interval between image formations. The characteristics detection is a process of applying a current to the LD 300, acquiring the optical output of the LD 300, detecting differential quantum efficiency, which is one of the characteristics, and detecting a threshold current, which is the other characteristic, from the differential quantum efficiency. The period between image formations is represented by a period during which the FGATE signal is negated. Examples of such a period include an interval between paper sheets and an interval between a paper sheet and each of a plurality of corrective toner patterns on the transfer belt. Reflecting the result is a process of determining a bias current level from the threshold current, and correcting the bias current by updating the bias current to such a level.

If forty lines are scanned for one page, there are forty effective scanning periods, and there are non-effective scanning periods before and after each of the effective scanning periods. Assuming that the interval between image formations corresponds to three lines, there are three effective scanning periods, and there are non-effective scanning periods before and after each of the effective scanning periods. The characteristics detection is performed during at least some of these non-effective scanning periods. The non-effective scanning period after completion of the effective scanning period for one line is continuous with the non-effective scanning period preceding the effective scanning period for the next line.

Assumed herein is an example in which currents at three different currents are input to the LD 300 to acquire three output results, differential quantum efficiency is detected, and a threshold current is detected from a summarized result of these output results. From the period indicated as A in FIG. 5, the characteristics detecting unit 312 acquires an output result from an input of a first input current level. In the period indicated as B, the characteristics detecting unit 312 acquires an output result from an input of a second input current level. In the period indicated as C, the characteristics detecting unit 312 acquires an output result from an input of a third input current level. These output results are stored in a storage device for temporary storage.

In the following period indicated as D, the characteristics detecting unit 312 acquires an output result from another input of the first input current level, and overwrites the output result acquired from the earlier input of the first input current level and having stored previously. In the periods indicated as E and F as well, the characteristics detecting unit 312 acquires output results from another input of the second input current level and another input of the third input current, respectively, and overwrites the respective output results. By repeating this process in the non-effective scanning period after the FGATE signal is negated, the characteristics detecting unit 312 acquires the respective output results, and summarizes the three output results stored in the storage device.

Figure 1:
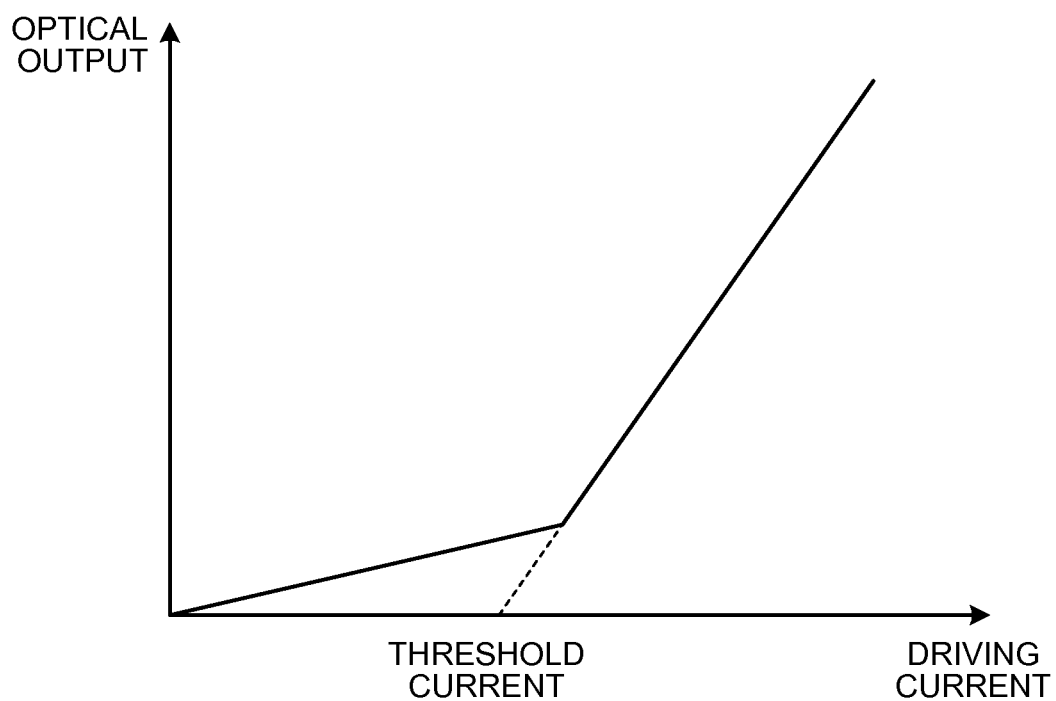
FIG. 1 is a schematic diagram illustrating a relation between an input current and an optical output.

For differential quantum efficiency, as an example, the characteristics detecting unit 312 acquires a linear relational expression in which an optical output sharply increases in a graph such as one illustrated in FIG. 1, and detects the differential quantum efficiency from the gradient of the line. The threshold current is detected from the current level resulting in a zero optical output in the relational expression. Once the characteristics detection is completed in the manner described above, the current correcting unit 313 determines the bias current level from the threshold current, and corrects the bias current by updating the setting value of the bias current to the current level.

The three input currents are used for convenience of explanation, which may be replaced with two or four or more input currents. In each of the non-effective scanning periods, a current taking one current level may be applied as an input current, or a current taking at two or more current levels may be applied as an input current. It is also possible to divide a range of current into some sub-ranges, to change the current level continuously within each of the sub-ranges, and to acquire a range of optical output corresponding to the sub-range in which the current level is changed, as an output result.

In the manner described above, formation of horizontal lines and rear side smearing can be prevented by causing the LD 300 to illuminate during the non-effective scanning periods, without causing the LD 300 to illuminate during the effective scanning period after the image formation for one page is completed. Furthermore, a downtime can be avoided because the result can be reflected before the next image formation, e.g., before printing of the next page, is started.

Figure 6:
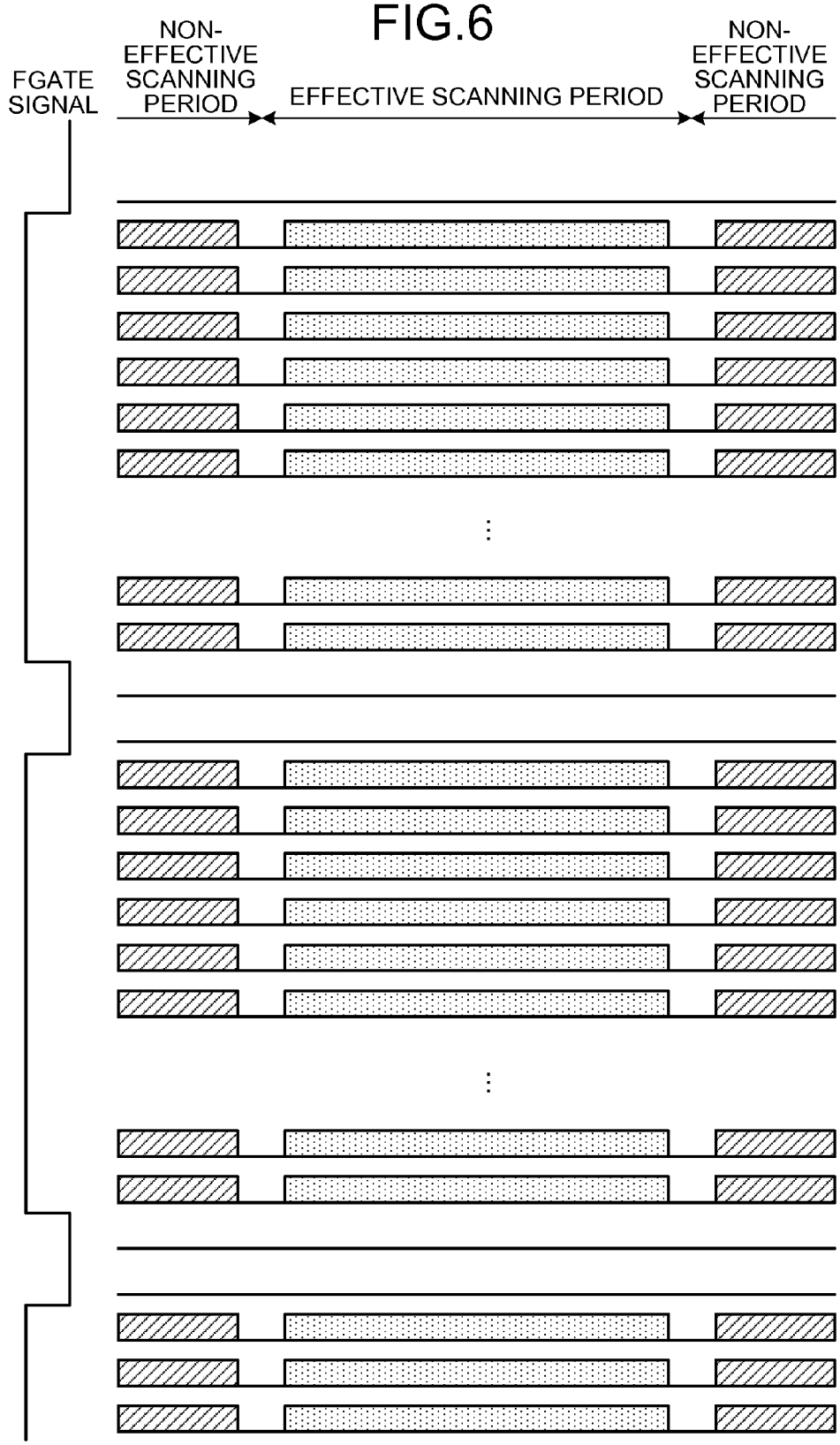
FIG. 6 is a schematic diagram illustrating a second timing at which a writing controlling unit conducts characteristics detections.

FIG. 6 is a schematic diagram illustrating an example in which execution of the characteristics detection between image formations is avoided. Because the characteristics detection is not performed between the image formations, the characteristics detection is completed before the FGATE signal is negated. For example, in an example in which six input currents are input to the LD 300, because scanning of three lines are required to acquire six output results, the characteristics detecting unit 312 acquires the last output result from the 39th line, and detects the threshold current subsequently.

In this embodiment, because the characteristics detection can be completed during the time in which the FGATE signal is asserted, the only process performed while the FGATE signal is negated is reflecting the result. By reflecting the result during the negation in the manner described above, an optimal bias current can be applied in units of a page.

If the detection result is reflected while the FGATE signal is asserted (during printing), a variation in the color shade could occur because the bias current is changed. By reflecting the detection result during the negation, this issue can be addressed. Furthermore, because performed during the negation is only reflecting the result, this characteristic detection can be applied to a system that uses a short interval between image formations.

In the embodiment illustrated in FIGS. 5 and 6, the characteristics detecting unit 312 overwrites an output result having acquired previously with an output result acquired later in time, so that only the latest output result is used in the characteristics detection. However, the output result acquired most lately could be largely deviated from an expected result due to some factors. Therefore, the characteristics detecting unit 312 may also be configured to retain some of the output results corresponding to each of the input current levels, and to use appropriate one of the results in the characteristic detection.

For example, the characteristics detecting unit 312 may be configured to determine if the latest output result is deviated from an expected result by a certain degree, and, if such a deviation is confirmed, to use the output result previous to the output result most lately acquired. If the previous output result also has such a deviation, the characteristics detecting unit 312 may use the output result further previous to the previous output result. As the expected result, a value acquired through experiments or the like preliminarily performed can be used.

In the embodiment illustrated in FIGS. 5 and 6, the characteristics detections are performed during the non-effective scanning periods, but the output results acquired previously are overwritten and wasted. In the example in which six input currents are input to the LD 300, it is sufficient if six output results corresponding to these current levels are acquired. Therefore, the characteristics detection may be performed during the non-effective scanning periods corresponding to three lines. This characteristics detection may be performed anywhere in the non-effective scanning periods.

If the characteristics detection is performed immediately after the FGATE signal is asserted, the LD 300 repeats being illuminated and being extinct until the FGATE signal is negated. Therefore, the conditions of the LD 300 could change during this process. Hence, it is preferable to perform the characteristics detection immediately before reflecting the result.

Figure 7:
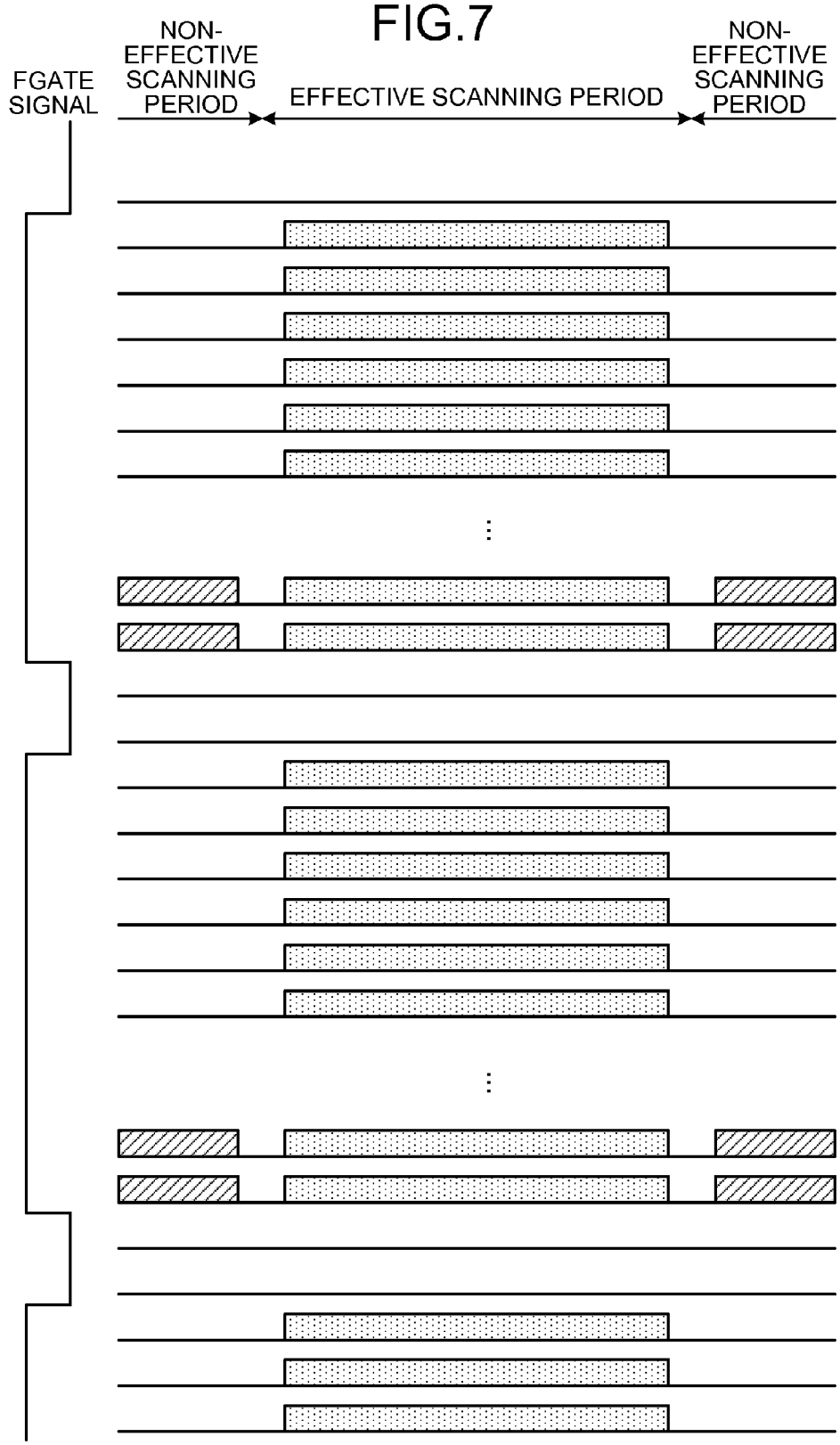
FIG. 7 is a schematic diagram illustrating a third timing at which a writing controlling unit conducts characteristics detections.

FIG. 7 is a schematic diagram illustrating an example in which the characteristics detection is performed immediately before reflecting the result, and the result is reflected during the interval between the image formations. To explain using the example described earlier, the characteristics detection is not conducted during the non-effective scanning periods in the first to the 37th lines. The characteristics detection is performed during the non-effective scanning periods of the remaining three lines, which are the 38th to the 40th lines. This configuration is intended to perform the characteristics detections in such a manner that the characteristics detections are completed before the FGATE signal is negated, and completed at timing closest to the negation.

In this embodiment, the lifetime of the LD 300 can be extended because the LD 300 does not need to be illuminated while the first to the 37th lines are being scanned and during the non-effective scanning periods of these respective lines, except for the purpose of the synchronizing illumination and the APC. Furthermore, because the characteristics detection is completed before the FGATE signal is negated, reflecting the result is only performed during the negation of the FGATE signal. Therefore, this characteristic detection can be applied to a system that uses a short interval between image formations.

In this example as well, the output result acquired most lately could be largely deviated from an expected result due to some factors. Therefore, the characteristics detecting unit 312 may also be configured to retain some of the output results corresponding to each of the input current levels, and to use appropriate results in the characteristic detection from those thus retained.

Figure 8:
FIG. 8 is a schematic diagram illustrating a fourth timing at which a writing controlling unit conducts characteristics detections.

The embodiment illustrated in FIG. 7 can be applied to a system in which the negation period is short. In systems using a relatively long period, the characteristics detection may be performed at the timing illustrated in FIG. 8. In FIG. 8, the characteristics detection is performed and the result is reflected during the interval between the image formations, without performing the characteristics detection while image formations for one page are performed. This is because, if the characteristics detection is performed while the FGATE signal is asserted, the degree of self-heating of the LD 300 varies depending on whether any image information is present immediately before the characteristics detection is performed, and the result is also affected by such self-heating of the LD 300.

In a system in which a sufficient interval can be ensured between the image formations, by performing the characteristics detection in the non-effective scanning periods during a negation, and by reflecting the result during the negation, formation of horizontal lines and rear side smearing can be avoided, and also the characteristics detection can be performed in a stable environment without being affected by the heating.

Figure 9:
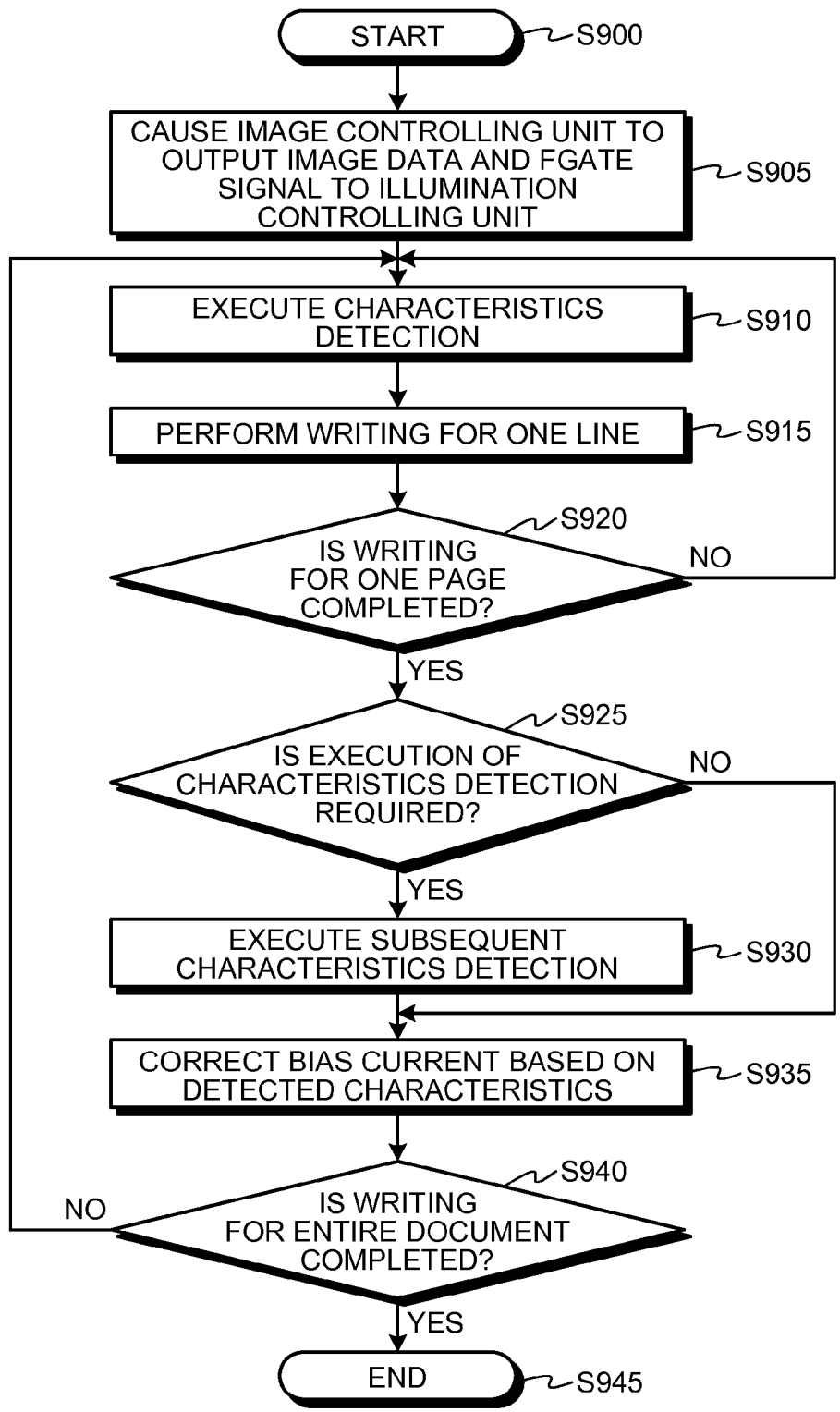
FIG. 9 is a flowchart illustrating a first embodiment of a writing controlling process.

A writing controlling process performed by the writing controlling unit will now be explained with reference to FIG. 9. FIG. 9 illustrates the writing controlling process according to the embodiment illustrated in FIG. 5. This writing controlling process is started at Step S900 when an operation input via the operating unit 207 is received, for example. The CPU 200 reads the image data retained on the image memory 204 based on the operation input, performs a predetermined process such as decompression, and writes the image data to the RAM 202. The CPU 200 then sends the image data written in the RAM 202 to the writing controlling unit.

At Step S905, once the image data is received, the writing controlling unit passes the image data to the image controlling unit 310. The image controlling unit 310 then generates image information corresponding to a plurality of pages, and outputs the image data in units of one page, as well as the FGATE signal, to the illumination controlling unit 311.

When the FGATE signal is asserted, at Step S910, the characteristics detection, which is triggered by completion of a synchronizing illumination, for example, is started. The characteristics detection is performed by driving the LD 300 by applying an input current at a predetermined current level, and by causing the characteristics detecting unit 312 to detect the characteristics.

At Step S915, the characteristics detecting unit 312 stops the characteristics detection before writing in the main-scanning direction is started based on the image information. The illumination controlling unit 311 then performs writing corresponding to one line in the main-scanning direction by controlling ON and OFF of the LD 300. In this example, the writing corresponding to one line is performed after the characteristics detection is performed, but the characteristics detection may also be performed after the writing corresponding to one line is completed.

At Step S920, the CPU 200 determines whether or not the FGATE signal is negated, and the writing for one page is completed. If the writing for one page is not completed, the process returns to Step S910, and the remaining characteristics detection and writing are performed for the next line.

If the writing for one page is completed, at Step S925, the CPU 200 determines whether or not the characteristics detection is still required. If the characteristics detection is required, the remaining characteristics detection is performed at Step S930. For example, in an example in which input currents at three currents are input to the LD 300 to acquire three output results, if output results for the remaining two input currents need to be acquired at the time when the FGATE signal is negated, the remaining characteristics detections are performed in the non-effective scanning periods for the remaining one line.

If the CPU 200 determines that the characteristics detection is no longer required at Step S925, or if the required characteristics detections are completed at Step S930, the bias current to be applied to the LD 300 is corrected based on the characteristics thus detected at Step S935.

At Step S940, the CPU 200 determines whether or not the writing for the entire document is completed. If the FGATE signal or image information is still being output, the CPU 200 can determine that the writing for the entire document is not completed. Therefore, the process returns to Step S910, and executes the characteristics detection and writing for the next page. If the writing for the entire document is completed, the system control goes to Step S945, and ends the writing controlling process.

Figure 10:
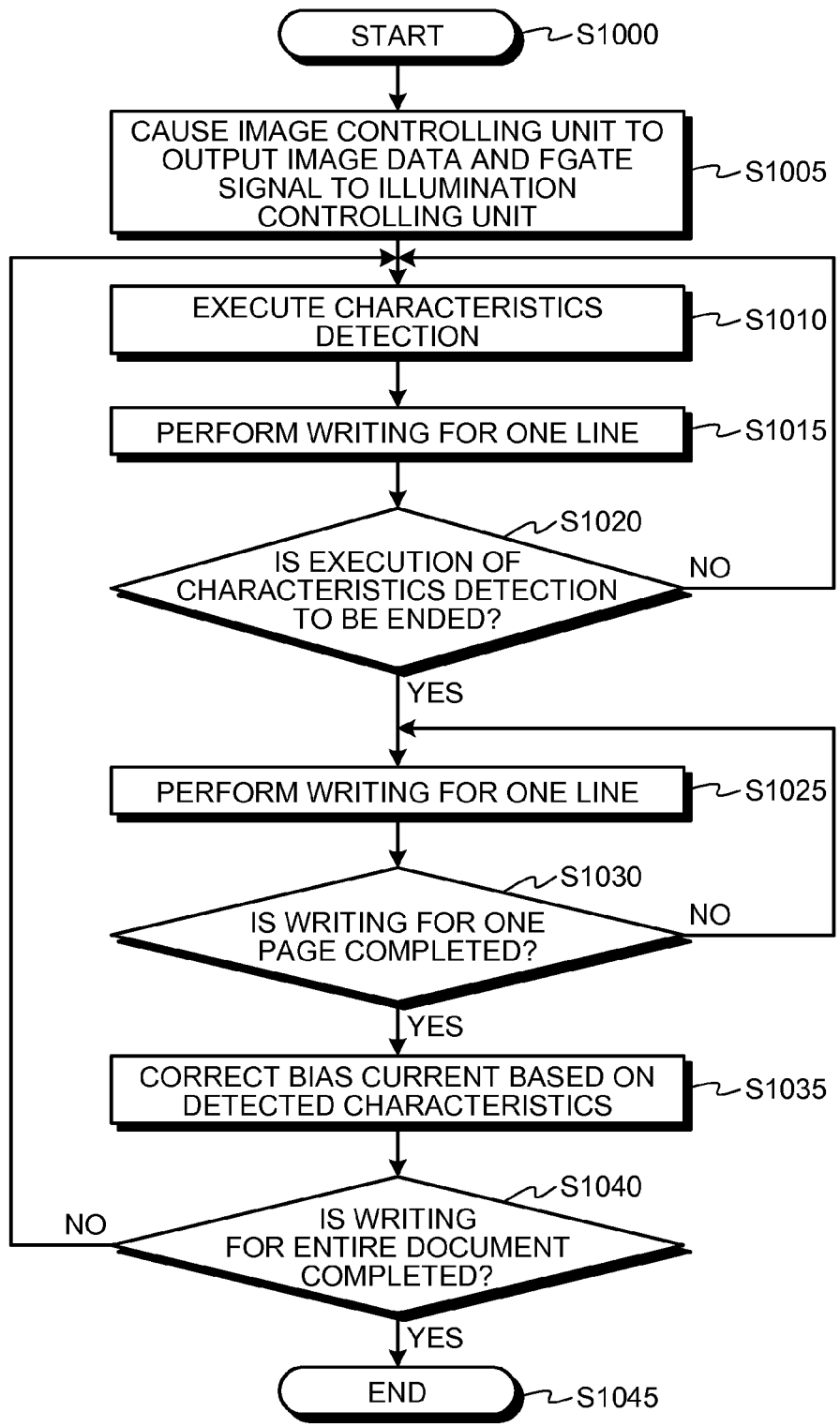
FIG. 10 is a flowchart illustrating a second embodiment of the writing controlling process.

FIG. 10 is a schematic diagram illustrating the writing controlling process according to the embodiment illustrated in FIG. 6. This process is started at Step S1000. At Step S1005, the image controlling unit 310 outputs the FGATE signal and the image information to the illumination controlling unit 311, in the same manner as at Step S905.

At Step S1010, the characteristics detection is executed. At Step S1015, the characteristics detection is stopped before writing in the main-scanning direction is started based on the image information. The writing corresponding to one line is then performed in the main-scanning direction. In this example as well, the characteristics detection may be performed after the writing corresponding to one line is completed.

At Step S1020, the CPU 200 determines whether or not the execution of the characteristics detection is to be ended considering the timing at which the FGATE signal is negated. To explain using the example in which the six input currents are input to the LD 300, six output results need to be acquired for the characteristics detection. Therefore, if there are three or more lines for which writing is not completed before a negation, the CPU 200 determines not to end the characteristics detection. If the remaining lines are less than three, the CPU 200 determines to end the characteristics detection. This is to end the characteristics detection during the time in which the FGATE signal is asserted.

When the characteristics detection is not ended, the process returns to Step S1010, and executes the characteristics detection again. When the characteristics detection is ended, the system control goes to Step S1025, and performs writing based on the image information, without performing the characteristics detection in the next line. At Step S1030, the CPU 200 determines whether or not the FGATE signal is negated, and the writing for one page is completed. If the writing for one page is not completed yet, the process returns to Step S1025, and the CPU 200 performs writing for the next line.

If the writing for one page is completed, the system control goes to Step S1035, and the bias current to be applied to the LD 300 is corrected based on the characteristics thus detected. At Step 1040, the CPU 200 determines whether or not the writing for the entire document is completed. If the writing for the entire document is not completed yet, the process returns to Step S1010, and executes the characteristics detection and the writing for the next page. If the writing for the entire document is completed, the system control goes to Step S1045, and ends the writing controlling process.

Figure 11:
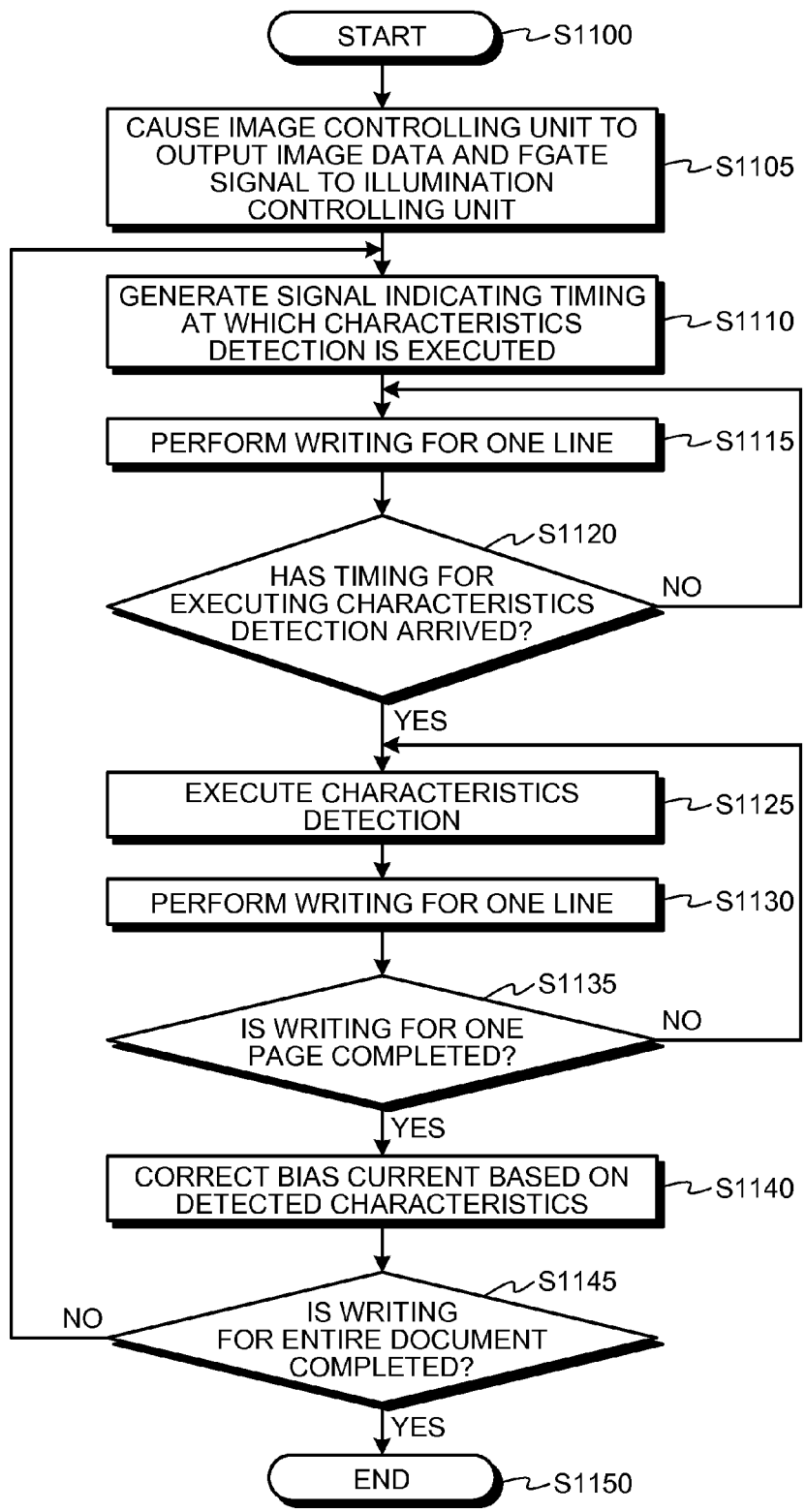
FIG. 11 is a flowchart illustrating a third embodiment of the writing controlling process.

FIG. 11 is a schematic diagram illustrating a writing controlling process according to the embodiment illustrated in FIG. 7. This process is started at Step S1100. At Step S1105, the image controlling unit 310 outputs the FGATE signal and the image information to the illumination controlling unit 311, in the same manner as at Step S905 and Step S1005.

At Step S1110, the CPU 200 generates a signal indicating the timing at which the characteristics detection is to be executed. For example, when three lines are required for the characteristics detection and one page has 40 lines, the CPU 200 generates a signal for starting the characteristics detection from the 38th line. The CPU 200 may cause the image controlling unit 310 to generate this signal, and to pass the signal to the illumination controlling unit 311 and the characteristics detecting unit 312, for example. Based on this signal, the illumination controlling unit 311 and the characteristics detecting unit 312 operate for the characteristics detection.

At Step S1115, the writing corresponding to one line in the main-scanning direction is performed based on the image information. At Step 1120, the CPU 200 counts the number of lines for which writing is completed, and determines whether or not timing for executing the characteristics detection has arrived. The number of lines can be counted by causing the image controlling unit 310 to count the number of effective scanning starting positions detected by the synchronization detecting plate 304 from when the FGATE signal is asserted, for example.

If the timing has not arrived yet, the process returns to Step S1115, and writing for the next line is performed. If the timing has arrived, the system control goes to Step S1125, and the CPU 200 executes the characteristics detection during the non-effective scanning period. At Step S1130, the writing for the line is performed in the effective scanning period. In this example as well, the characteristics detection may be performed after the writing corresponding to one line is completed.

At Step S1135, the CPU 200 determines whether or not the FGATE signal is negated, and the writing for one page is completed. If the writing is not completed, the process returns to Step S1125, and performs the remaining characteristics detection and writing for the next line.

If the writing for one page is completed, the system control goes to Step S1140, and corrects the bias current to be applied to the LD 300 based on the characteristics thus detected. At Step S1145, the CPU 200 determines whether or not the writing for the entire document is completed. If the writing is not completed yet, the process returns to Step S1110, and performs the characteristics detection for the next page. If the writing for the entire document is completed, the system control goes to Step S1150, and ends the writing controlling process.

Figure 12:
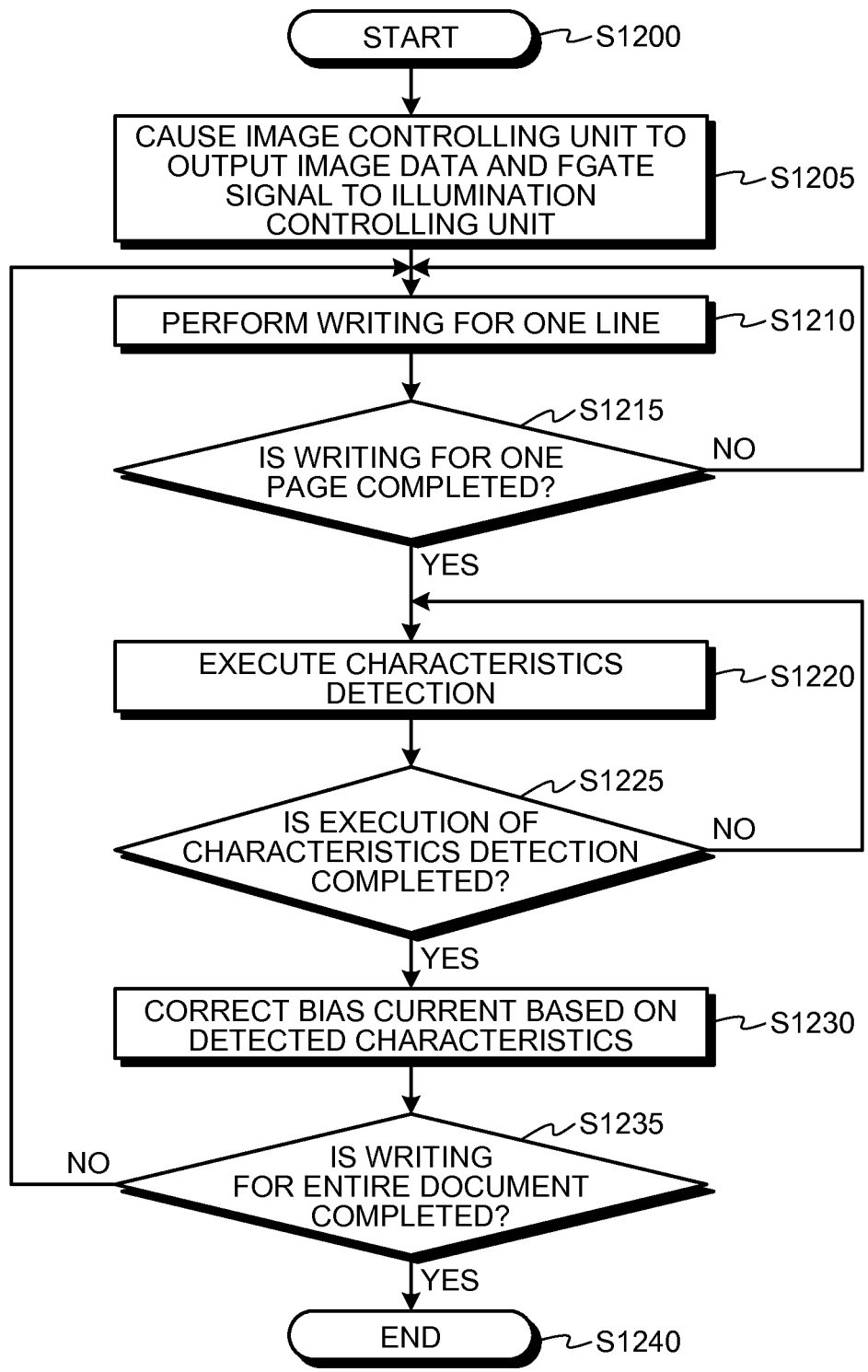
FIG. 12 is a flowchart illustrating a fourth embodiment of the writing controlling process.

FIG. 12 is a schematic diagram illustrating a writing controlling process according to the embodiment illustrated in FIG. 8. This process is started at Step S1200. At Step S1205, the image controlling unit 310 outputs the FGATE signal and the image information to the illumination controlling unit 311, in the same manner as at Step S905, Step S1005, and Step S1105.

At Step S1210, writing corresponding to one line is performed in the main-scanning direction based on the image information. At Step S1215, the CPU 200 determines whether or not the FGATE signal is negated, and the writing for one page is completed. If the writing for one page is not completed yet, the process returns to Step S1210, and performs writing for the next line.

If the writing for one page is completed, the system control goes to Step S1220, and executes the characteristics detection during the non-effective scanning period. At Step S1225, the CPU 200 determines whether or not the execution of the characteristics detection is completed. If the period corresponding to three lines are required for the characteristics detection, the CPU 200 may make this determination based on whether the period corresponding to three lines has elapsed.

If the execution is not completed yet, the process returns to Step S1220, and performs the remaining characteristics detection in the next line. If the execution is completed, the system control goes to Step S1230, and corrects the bias current to be applied to the LD 300 based on the characteristics thus detected.

At Step S1235, the CPU 200 determines whether or not the writing for the entire document is completed. If the entire writing is not completed yet, the process returns to Step S1210, and starts executing the writing for the next page. If the entire writing is completed, the system control goes to Step S1240, and ends the writing controlling process.

In the manner described above, because the detection result can be reflected in the interval between the image formations, e.g., in an interval between paper sheets, a downtime can be avoided. Furthermore, because the characteristics detection is performed during the non-effective scanning period, the LD 300 is not caused to illuminate on the photosensitive element 131 for the purpose of the characteristics detection. Hence, formation of horizontal lines and rear side smearing can be prevented.

Furthermore, the characteristics detection is executed and the result of the characteristics detection is reflected in unit of one page. Therefore, it is not necessary to provide means for detecting a change in the characteristics, and an optimal bias current can always be applied, so that the image forming apparatus can output printouts with a constant image quality.

According to the present invention, because the characteristics detection is conducted during the non-effective scanning periods, formation of horizontal lines or smearing of a rear side can be avoided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A writing controlling apparatus for controlling a current to be applied to a light source that is used in performing writing on an image carrier for performing image-forming on a sheet, the writing controlling apparatus comprising:
   an acquiring unit configured to acquire a plurality of light amounts of the light source driven while changing an input current in non-effective scanning periods of main-scanning during which the image carrier is not irradiated with light from the light source in a period from when image-forming on a sheet is started to when image-forming on a next sheet is started excepting an interval between sheets, as a plurality of output results;
   a detecting unit configured to detect characteristics of the light source using the output results thus acquired; and
   a correcting unit configured to correct the current to be applied to the light source based on the characteristics thus detected.

2. The writing controlling apparatus according to claim 1, further comprising:
   a signal output unit configured to output an FGATE signal indicating that an image formation is currently being executed or has been completed, wherein
   the correcting unit corrects the current while the FGATE signal is negated, that is, indicating that the image formation has been completed.

3. The writing controlling apparatus according to claim 2, wherein the detecting unit executes detection of the characteristics before the FGATE signal is negated in such a manner that the detection of the characteristics is completed at a point in time nearest to the time when the FGATE signal is negated.

4. The writing controlling apparatus according to claim 2, wherein the detecting unit performs the detection of the characteristics in response to the FGATE signal being negated.

5. The writing controlling apparatus according to claim 1, wherein the detecting unit acquires the output results in the non-effective scanning periods, and detects a threshold current as one of the characteristics using the output results.

6. An image forming apparatus comprising:
   an image carrier; a light source configured to output light with which writing on the image carrier is performed; and a writing controlling apparatus configured to control a current to be applied to the light source, wherein
   the writing controlling apparatus comprises:
      an acquiring unit configured to acquire a plurality of light amounts of the light source driven while changing an input current in non-effective scanning periods of main-scanning during which the image carrier is not irradiated with light from the light source in a period from when image-forming on a sheet is started to when image-forming on a next sheet is started excepting an interval between sheets, as a plurality of output results;
      a detecting unit configured to detect characteristics of the light source using the output results thus acquired; and
      a correcting unit configured to correct the current to be applied to the light source based on the characteristics thus detected.

7. The image forming apparatus according to claim 6, wherein the writing controlling apparatus further comprises a signal output unit configured to output an FGATE signal indicating that an image formation is currently being executed or has been completed, wherein the correcting unit corrects the current while the FGATE signal is negated, that is, indicating that the image formation has been completed.

8. The image forming apparatus according to claim 7, wherein the detecting unit executes detection of the characteristics before the FGATE signal is negated in such a manner that the detection of the characteristics is completed at a point in time nearest to the time when the FGATE signal is negated.

9. The image forming apparatus according to claim 7, wherein the detecting unit performs the detection of the characteristics in response to the FGATE signal being negated.

10. The image forming apparatus according to claim 6, wherein the detecting unit acquires the output results in the non-effective scanning periods, and detects a threshold current as one of the characteristics using the output results.

11. A computer program product comprising a non-transitory computer-readable recording medium having a computer-readable computer program for performing controlling of a current to be applied to a light source that is used in performing writing on an image carrier, wherein the computer program causes a computer to execute:

acquiring a plurality of light amounts of the light source driven while changing an input current in non-effective scanning periods of main-scanning during which the image carrier is not irradiated with light from the light source in a period from when image-forming on a sheet is started to when image-forming on a next sheet is started excepting an interval between sheets, as a plurality of output results;

detecting characteristics of the light source using the output results thus acquired; and correcting the current to be applied to the light source based on the characteristics thus detected.

12. The computer program product according to claim 11, wherein the computer program further comprising:

outputting an FGATE signal indicating that an image formation is currently being executed or has been completed, wherein at the correcting, the current is corrected while the FGATE signal is negated, that is, indicating that the image formation has been completed.

13. The computer program product according to claim 12, wherein, at the detecting, detection of the characteristics is executed before the FGATE signal is negated in such a manner that the detection of the characteristics is completed at a point in time nearest to the time when the FGATE signal is negated.

14. The computer program product according to claim 12, wherein the detection of the characteristics is performed in response to the FGATE signal being negated.

* * * * *